Feb. 11, 1975 J. F. SCHIRTZINGER Re. 28,332
METHOD AND APPARATUS FOR PREVENTING ICE
DAMAGE TO MARINE STRUCTURES
Original Filed June 15, 1970 4 Sheets-Sheet 1

United States Patent

Re. 28,332
Reissued Feb. 11, 1975

28,332

METHOD AND APPARATUS FOR PREVENTING ICE DAMAGE TO MARINE STRUCTURES

Joseph F. Schirtzinger, Pasadena, Calif., assignor to Sea-Log Corporation, Pasadena, Calif.

Original No. 3,669,052, dated June 13, 1972, Ser. No. 46,273, June 15, 1970. Application for reissue Oct. 25, 1973, Ser. No. 409,747

Int. Cl. B63b *35/08*

U.S. Cl. 114—.5 R 15 Claims

Matter enclosed in heavy brackets [ ] appears in the original patent but forms no part of this reissue specification; matter printed in italics indicates the additions made by reissue.

ABSTRACT OF THE DISCLOSURE

A marine well drilling platform or the like having legs extending to the sea floor is protected from ice floes by comminuting devices at the water line for breaking the ice anl thereby preventing crushing or overturning of the platform. The comminuting devices employ high velocity impacts against the ice to cause its fracture into chips as distinguished from cutting action. Rapidly rotating or reciprocating mechanisms with large "teeth" for making impact engagement with the ice are employed in separate embodiments. Comminuting devices mounted for sweeping adjacent a mooring buoy in one embodiment open a path through an ice floe for protecting the buoy and a ship moored at the buoy.

BACKGROUND

Within the last few years test wells have indicated the existence of billions of barrels of petroleum along the north coast of Alaska, the delta of the MacKenzie River in Canada, and on the Arctic Islands north of the Canadian Mainland. Much of this enormous oil reserve is located beneath the sea bed and it becomes desirable to provide well drilling and oil recovery platforms mounted on the sea bed for recovering such oil.

Even in the relatively temperate zones surrounding the continental United States, there are substantial problems in maintaining well drilling platforms in the open ocean. The rigors of an arctic environment further complicate the problems of offshore drilling apparatus. One problem not encountered in more temperate zones is the presence of ice floes that may damage the supports on which the offshore platform is mounted. The ice floes are enormous sheets of ice sometimes several feet in thickness and extending for many miles. These sheets of ice are driven by wind, and current action so that they move along the ocean surface. The movements of ice floes in the Arctic Ocean due to wind and current are in the order of 5 nautical miles per day with maximum probable rates of about 40 nautical miles per day, that is, a little less than about 2 knots. In some arctic waters, vertical ice movement due to tides in the order of 30 feet in a 6 hour tidal interval may occur. The pressure due to the lateral and vertical movements of the ice floes tend to crush or overturn an offshore structure unless the effect is somehow limited.

In general, drilling platforms are located above the surface of the water (and ice) and are supported on from one to four columns or legs resting on or driven into the sea bottom or on pads which, in turn, rest on the bottom, or in some circumstances, float at a fixed depth below the surface of the sea. Piles, driven anchors and weights of various kinds are used to assist in holding platforms in a fixed position.

In the handling of petroleum, whether recovered from offshore platforms or from wells on land, two principal approaches have been proposed.

One of these involves a pipeline from the north slope of Alaska to an ice free Pacific port in southern Alaska. This has substantial disadvantages that may make installation impractical because of the impact on the environment. The ecology of northern Alaska depends on a shallow layer which exists in delicate thermal balance between the underlying permafrost and the atmosphere with its sparse rainfall and wide annual variations of temperature and solar radiation. Any disturbance of this balance, even as slight as that caused by a track-type vehicle moving along a slope in summer, has been found in some circumstances to damage the surface vegetation enough to create an erosion gully in which growth is not reestablished. The installation of a 4-foot pipeline carrying heated oil (no matter how well insulated) could cause significant impact on the environment and, if so, the pipeline construction can be completed only at the expense of the environment. Another difficulty with a pipeline is that the entire flow is through a single conduit and damage to the conduit can completely cut off the flow.

An alternative solution is to carry the oil from the north slope to market in large tankers capable of travel through the ice. Such tankers are heavily armored and rely on propulsion and weight to crush their way through heavy ice. Once frozen into the ice such a tanker may be incapable of breaking loose without assistance until a substantial thaw occurs. The tankers are advantageous since many would be employed and the incapacitation of one or more tankers does not completely cut off the flow of oil.

In order to load tankers, anchored buoyant moorings and platforms may be held in position in the water by chains and cables to anchors. During loading the tanker is moored to or near the mooring buoy and oil is transferred through a conduit from the buoy to the tanker. In arctic waters, it is necessary to protect not only the buoy but also the tanker from ice floes during the time that it is being loaded.

It is therefore desirable to provide means for protecting either fixed or free flowing structures from ice floes.

BRIEF SUMMARY OF THE INVENTION

Thus, in practice of this invention according to a presently preferred embodiment there is provided on a structure positioned in water subject to moving ice floes, means adjacent the water line for comminuting an ice floe in the region between the advancing ice floe and the balance of the structure wherein the means for comminuting comprises means for applying intermittent high velocity impacts on the ice.

In a preferred embodiment, the means for comminuting comprises rapidly rotatable or reciprocatable mechanisms having impacting teeth for engaging the ice and causing shattering thereof. The structure may be a well drilling platform, a pumping platform, mooring buoy or anchored vessel.

DRAWINGS

These and other features and advantages of the invention will be appreciated as the same becomes better understood by reference to the following detailed description of a presently preferred embodiment when considered in connection with the accompanying drawings, wherein.

Figure 2:
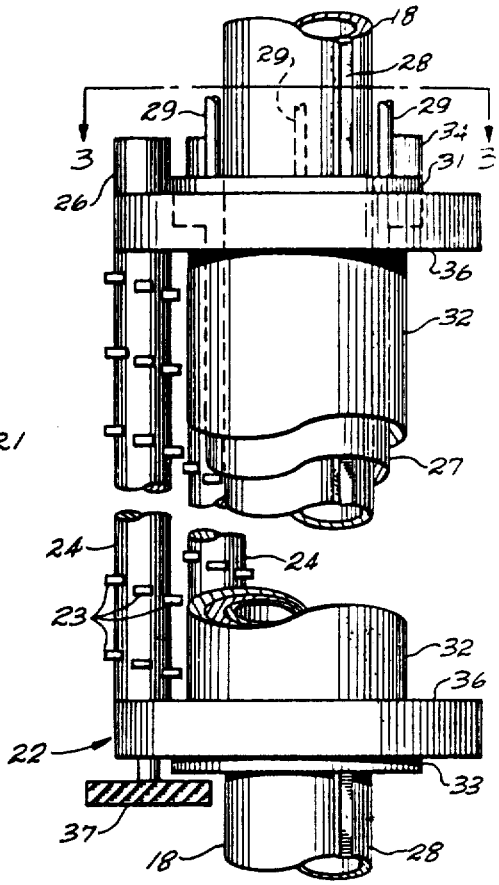
FIG. 2 is a side view of an ice comminuting mechanism on a leg of the platform of FIG. 1.
Figure 4:
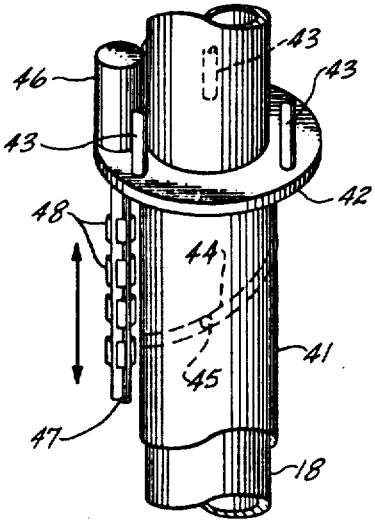
Figure 5:
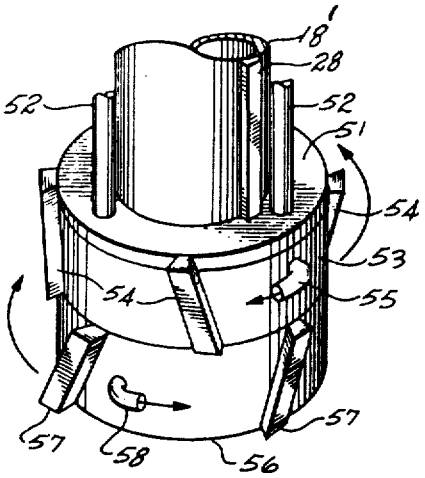
Figure 9:
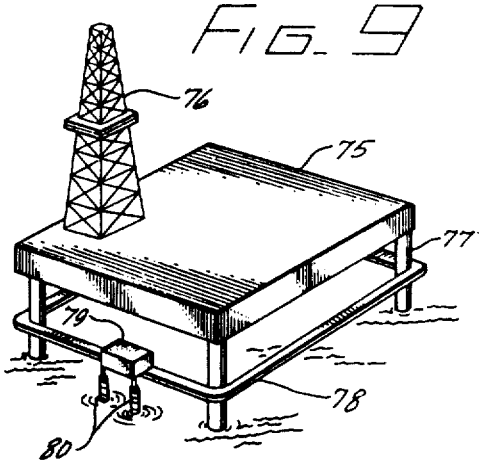
Figure 7:
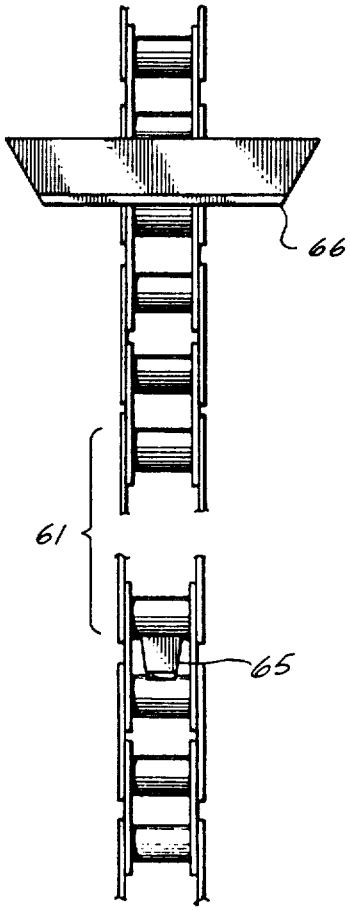
Figure 6:
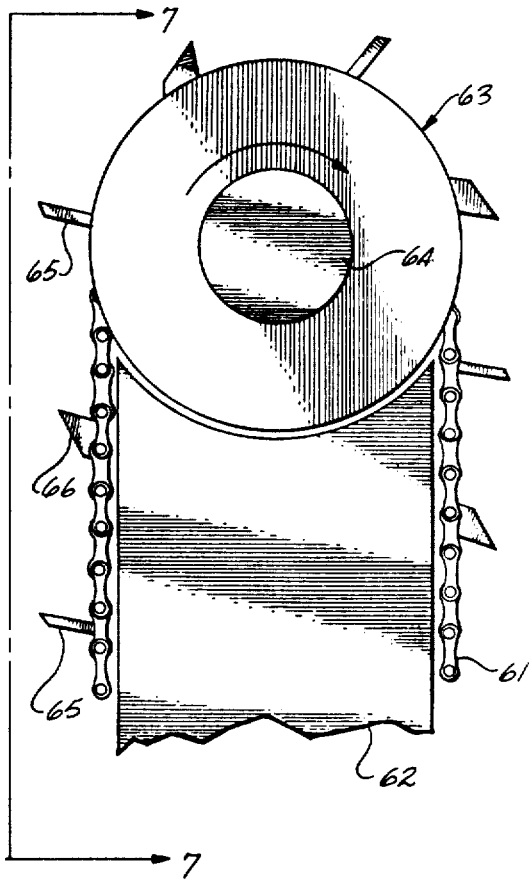
Figure 10:
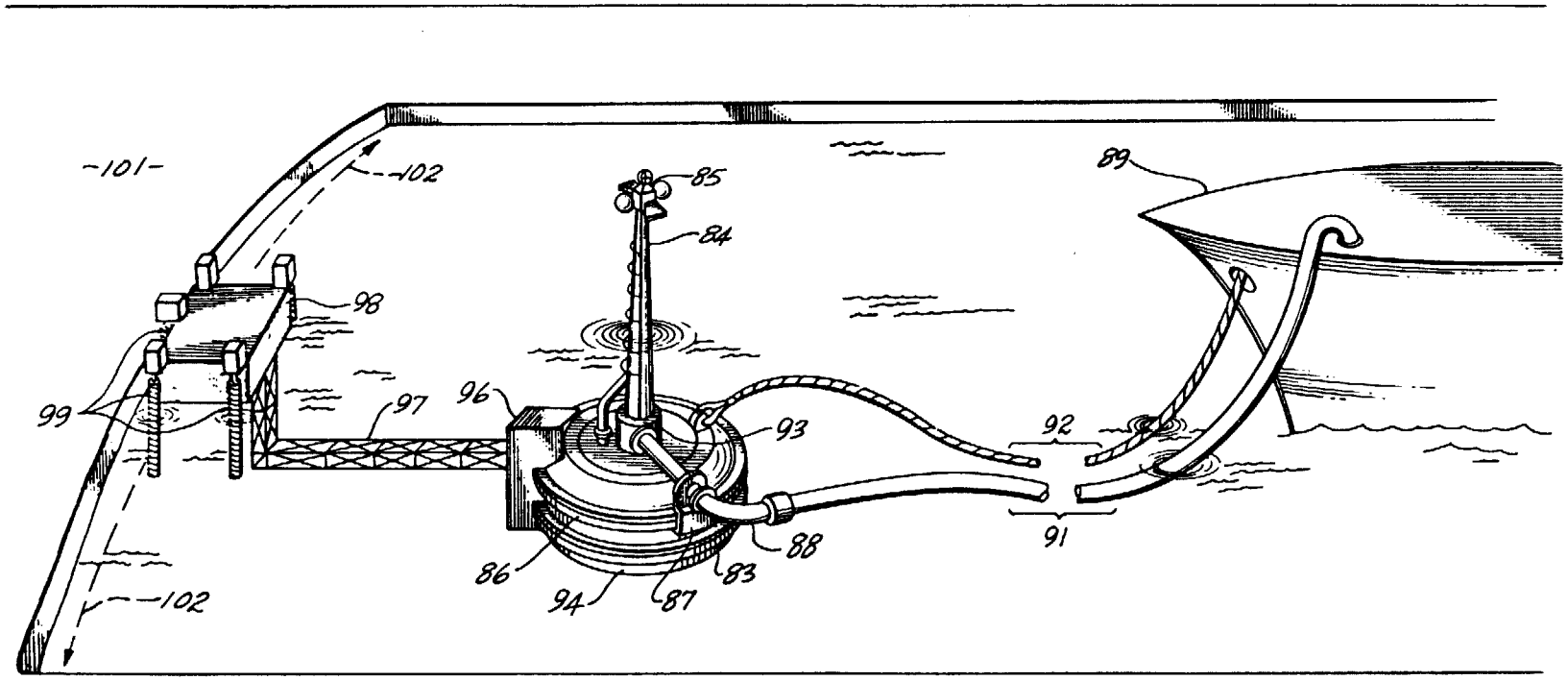
Figure 8:
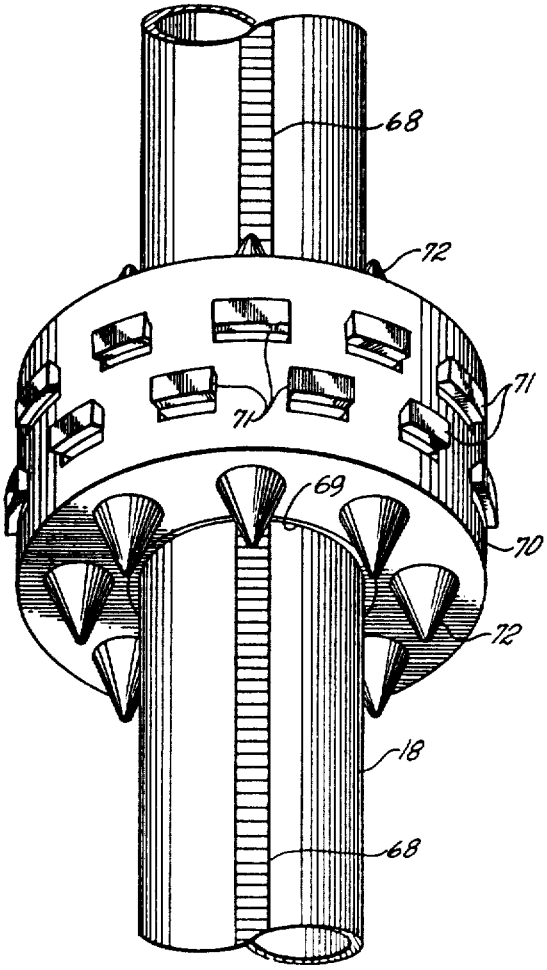
Figure 11:
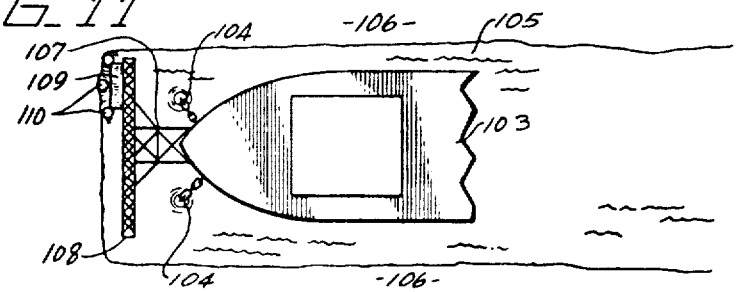

FIG. is an end view of the comminuting mechanism of FIG. 2;

FIG. 4 is a perspective view of an alternative ice comminuting mechanism employing reciprocating motion;

FIG. 5 illustrates in perspective another rotatable ice comminuting mechanism;

FIG. 6 is a side view of an ice comminuting mechanism in the general style of a "chain saw";

FIG. 7 illustrates a detail of teeth of the mechanism of FIG. 6;

FIG. 8 illustrates a reciprocating ice comminuting mechanism;

FIG. 9 illustrates another typical drilling platform provided with a comminuting mechanism mounted on a track;

FIG. 10 illustrates in perspective an ice comminuting arrangement for protecting a buoy and tanker; and FIG. 11 illustrates in plan view an ice comminuting arrangement for protecting an anchored ship.

Throughout the drawings like numerals refer to like parts.

DESCRIPTION

Figure 1:
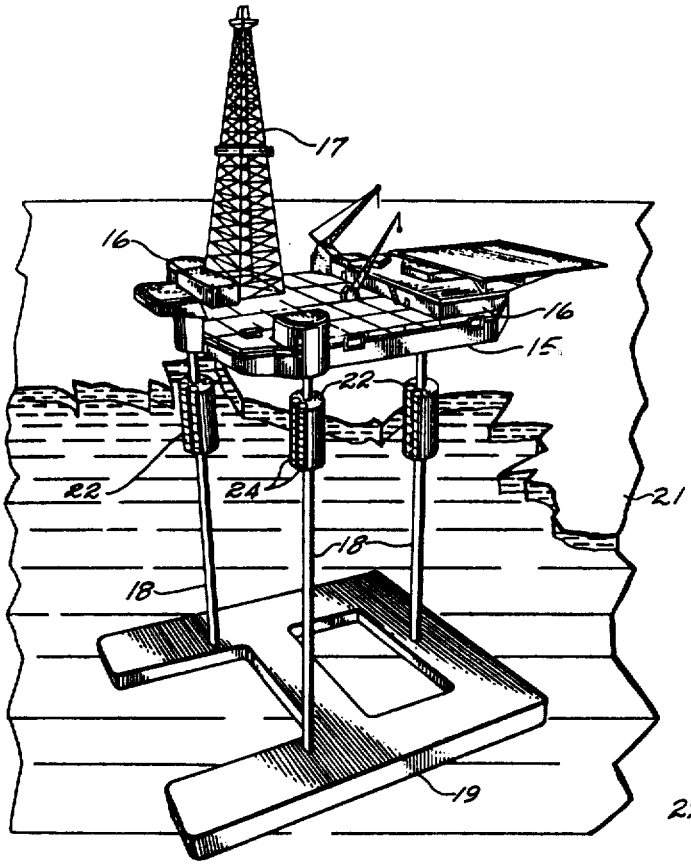
FIG. 1 illustrates a typical well drilling platform mounted on the sea floor and provided with means for preventing damage by ice floes.

FIG. 1 illustrates in perspective a typical well drilling platform 15 incorporating principles of this invention. In the illustrated embodiment, the platform incorporates various habitable structures 16 in which the usual operations of drilling, completing, and producing oil wells are conducted. Typically a high tower 17 is provided on the platform for handling the pipe, drilling tools, and other equipment employed in the drilling of subaqueous oil wells. The platform in this embodiment is mounted on three cylindrical legs 18 extending downwardly from the platform to a large A-shaped base 19 to which the legs are securely attached. The base 19 rests on the ocean floor, and the large weight of the base maintains the entire structure in a fixed position irrespective of forces on the structure due to wind, waves, current, tides, and the like. If desired, the base 19 may be more firmly secured to the sea floor by means of piles driven into the formations forming the sea floor.

Typically, the platform 15 is mounted a substantial distance above the surface of the water at the highest tide level so as to be relatively secure from wave action so that minor storms do not impair the ability to operate. In arctic waters, a large ice floe 21 may be encountered extending for great distances and moving laterally against the legs 18. The direction from which the ice floe 21 presses against the structure is to some degree predictable since there are prevailing winds and currents commonly found in most areas. Temporary conditions such as storms or substantial wind changes may cause the ice floe to travel in something other than the usual prevailing direction and, therefore, it is desirable to provide ice floe protection equally operable in any direction.

As the ice floe 21 contacts the legs 18, a substantial lateral pressure due to the rigid ice pressing against the legs will occur. If the base 19 is securely attached to the sea floor the pressure of the ice may crush or buckle the legs causing the entire structure to collapse. The lateral pressure of the ice floe against the legs, combined with a raising force due to rising tide, will tend to topple the entire structure. In order to prevent the ice floe from imposing such undersirable pressures on the legs of the structure an ice comminuting mechanism 22 is provided on each of the legs 18 of the structure.

In the illustrated embodiment the legs of the structure are cylindrical and a comminuting device is readily provided around the cylindrical leg. In some circumstances the legs of a drilling platform are fabricated of girders and other truss-like arrangements of structural steel for providing rigidity. If desired, the portion of the leg passing through the ice zone adjacent the water surface can be provided with a cylindrical sheath on which a comminuting mechanism can be provided, or other arrangements for causing a comminuting device to circumscribe a leg of a drilling platform can readily be provided as will be apparent to one skilled in the art. In some circumstances, a so-called monopod is employed for a drilling platform, which amounts to one large diameter central leg on which the platform rests. With such an arrangement, a single ice comminuting arrangement circumscribing the single leg can be provided.

Figure 3:
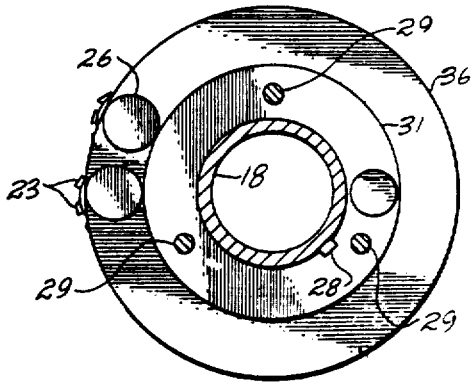

FIGS. 2 and 3 illustrate a typical ice comminuting mechanism 22 constructed according to principles of this invention. It turns out that ice is an unusual material in that it is one of the very few solid materials that break in a "taffy-like" manner. Materials of this sort break in a manner that is dependent more on the rate and concentration of application of the breaking force than on the magnitude of the force itself. A steady application of force on ice may cause it to creep or flow in response to the force without breaking, A lesser force applied at a high rate in a limited region may cause substantial fracturing of the ice. Therefore, in order to achieve the maximum ice breaking effect with a minimum amount of energy expended, it is desirable to produce a rapid impact on the ice preferably in a relatively small region. The maximum shattering effect on the ice is obtained by a plurality of cutter teeth driven at very high surface speed for intermittent impact on the ice.

In the embodiment illustrated in FIGS. 2 and 3 a plurality of relatively large cutter teeth 23 are provided in a generally helical pattern about each of a pair of cylindrical mandrels 24. The cylindrical mandrels 24 are rotatable at high speed by conventional electric motors 26 or the like. The teeth 23 are preferably relatively sharp with clearance and back rake for maximum localizing of impact on the ice.

The entire comminuter 22 is mounted on a leg 18 of the drilling platform by way of a cylindrical sleeve 27 that fits around the leg and provides torsional rigidity. The portion of the leg 18 adjacent the water level is provided with a longitudinally extending key 28 which engages in a key way in the sleeve 27 to prevent its rotation about the leg. Three longitudinally extending bars 29 are connected to a flange 31 at the upper end of the sleeve 27. The bars 29 extend up to the platform 15 or to some intermediate structure arranged below the platform and above the high tide level. The bars are connected to an elevating mechanism (not illustrated) which can be hydraulically, pneumatically, electrically, or mechanically driven so that the entire comminuting mechanism 22 can be raised or lowered as desired. Thus, for example, it may be desirable to raise the entire mechanism above the water level in order to provide access for replacing cutter teeth or performing other routine maintenance. The bars 29 may also be employed for raising and lowering the entire comminuting mechanism so that it follows the rise and fall of the tide. This permits use of a comminuting mechanism having a mandrel 24 only as long as the maximum expected ice thickness rather than one that includes the maximum ice thickness plus the maximum tidal difference.

Surrounding the sleeve 27 slidably movable along the length of the leg 18, is a second sleeve 32 fitted between the flange 31 at the top of the inner sleeve and a second flange 33 at the lower end of the inner sleeve. The outer sleeve 32 is mounted for rotation about the axis of the leg relative to the inner sleeve 27 and is driven in rotation by an electric motor 34 mounted on the end flange 31. The outer sleeve 32 has flanges 36 at its ends and the two mandrels 24 are mounted between the two flanges. Beneath the bottom flange 36 is a rotatable extension of the mandrel 24 having a cutter 37 similar to an end mill. If desired the cutter 37 may comprise a plate rotatable at high speed with the mandrel and having one or two large impact teeth.

During operation, the entire cutter mechanism 22 is placed in a position on the length of the leg 18 at approximately the water level so that the upper and lower extent of any ice floe is between the ends of the two mandrels 24. The mandrels are rotated at high speed by motors 26 and at the same time the outer sleeve 32 is rotated about the inner sleeve 27 by the motor 34. The slow rotation of the outer sleeve sweeps the rapidly rotating mandrels across the face of an advancing ice floe so that the teeth 23 intermittently and repeatedly impact on the surface of the ice causing fracturing thereof. The sweeping of the impact mandrels around the periphery of the leg at the level of the ice floe prevents accumulation of ice on any side of the leg and continually breaks away the ice of the advancing flow for minimizing lateral pressure on the tower leg. The cutters 37 on lower end of the mandrels provide a means for lowering the entire comminuting mechanism into the ice in case it is necessary to raise the mechanism above the top of the ice at some time during its operation, say, for example, for routine maintenance. The sweep of the cutters 37 around the leg permits the entire comminuting mechanism to be lowered through the ice.

The action of the teeth 23 against the ice is in the manner of a plurality of rapid impacts because of the high surface speed of the blades. The repeated high rate impacts of teeth on the ice causes fracturing in a brittle manner. Such impacting is to be distinguished from the "shaving" that occurs as a saw cuts through ice wherein each successive tooth effectively shaves away a fine swarf from the ice. In the illustrated ice comminuter only a few relatively large teeth with clearance and back rake are employed that intermittently strike the ice at high rates of impact in a localized area, thereby causing a substantial shattering of the ice and removal of chips larger than the path swept out by the teeth themselves.

Preferably, the teeth 23 on the mandrel 24 are arranged in a helical pattern and rotated in a direction that in general tends to convey the chips produced by the several teeth in an upward direction so that they are scattered over the top of the adjacent ice floe or dropped into relatively open water on the "downstream" side of the leg.

In the illustrated arrangement two relatively closely spaced rotatable mandrels 24 are provided; however, it will be apparent to one skilled in the art that if desired additional mandrels can be employed for more rapid cutting or to provide increased redundancy in the cutting system. Such additional cutters can be mounted adjacent the illustrated cutters or may, for example, be placed on the opposite side of the flanges 36 from the illustrated cutters. Many other such arrangements will be apparent to one skilled in the art.

FIG. 4 illustrates another embodiment of ice comminuting mechanism useful in practice of this invention. As illustrated in this embodiment a leg 18 of the tower is provided with a circumscribing sleeve 41. A flange 42 is provided at each end of the sleeve 41 (only the upper flange is illustrated and it will be understood that the lower flange is substantially identical). Rods 43 connected to the flange 42 extend upwardly for raising and lowering the comminuting mechanism to follow the ebb and flow of the tide. A helical groove 44 on the inside surface of the sleeve 41 engages a pin 45 on the outside of the cylindrical leg 18. Raising and lowering of the comminuting mechanism therefore causes the sleeve 41 to be rotated about the cylindrical leg.

Mounted on the flange 42 are a plurality of hydraulic or pneumatic actuators 46 to which are connected longitudinally extending mandrels 47. In the illustrated arrangement only two such actuators and mandrels are illustrated; however, it will be understood that additional such combinations can be provided over much or all of the periphery of the sleeve 41 as may be desired. The mandrels 47 are provided with a plurality of relatively large teeth 48 extending outwardly from the mandrels. In operation the actuators 46 intermittently stroke in a longitudinal direction so that the mandrels are reciprocated up and down at a high rate. The teeth 48 impact against ice in a floe causing shattering thereof in substantially the same manner as the high speed teeth 23 on the rotating mandrel of the embodiment of FIGS. 2 and 3. Raising and lowering of the sleeve 41 by means of the rods 43 causes it to be rotated about the leg due to engagement of the groove 44 with the pin 45. This causes the reciprocating mandrels to sweep out an arcuate path and maintain the entire periphery of the leg free of ice pressure.

FIG. 5 illustrates in perspective another embodiment of rotating ice comminuter incorporating principles of this invention. As illustrated in this embodiment, a plate 51 circumscribes a leg 18 of a drilling tower. The plate 51 is prevented from rotating relative to the tower leg by a key 28 and can be raised and lowered along the length of the tower leg as desired by means of longitudinally extending rods 52. Mounted beneath the plate 51 is a rotatable ring 53 on the periphery of which are secured a few large impacting teeth or bars 54. A tangentially extending nozzle 55 (or if preferred a plurality of such nozzles) is provided on the periphery of the ring 53 so that high velocity fluid such as compressed air, exhaust gases, steam, or water can be ejected for causing the entire ring 53 to rotate at high speed.

Mounted beneath the upper rotatable ring 53 is a substantially similar rotatable ring 56 having peripheral teeth or bars 57. A tangentially extending nozzle 58 through which high velocity fluid can be ejected is provided on the periphery of the ring 56 for causing rotation in a direction opposite to the direction of rotation of the upper ring 53. It is preferred to skew the teeth 54 and 57 in a direction that tends to throw the chips produced in a generally upward direction for clearing the ice chips away from the kerf cut by the teeth on the rapidly rotating rings.

It will be apparent to one skilled in the art that other tooth arrangement and driving mechanisms can be employed in such an embodiment or, if desired, a different number of rotatable rings can be employed.

FIG. 6 illustrates in side view a portion of another ice comminuting mechanism useful in practice of this invention. As illustrated in this embodiment, a roller chain 61 extends in a generally vertical direction along a chain backing member 62, illustrated only schematically in FIG. 6 (such backing members are well known in the so-called chain saws). The roller chain 61 passes over a drive pulley 63 mounted on a shaft 64 driven by some conventional motor (not shown).

As seen in the side view of FIG. 6, and in greater detail in the face view of FIG. 7, two types of teeth are mounted on the roller chain. A first tooth 65 is relatively long and narrow, that is, it extends a substantial distance from the chain in the plane of the chain, and does not extend a substantial distance out of the plane of the chain. These teeth are preferably cocked forwardly for providing back rake with ease of sharpening. A second type of tooth 66 alternating with the first type of tooth 65 is relatively broad in a direction normal to the plane of the chain, and is relatively short in a direction in the plane of the chain. These teeth also have both clearance and back rake for localized impacting on ice. Thus, as the chain is rapidly rotated by the drive pulley 63, the ice encountered by the teeth is alternately impacted by the long narrow teeth 65 and the short wide teeth 66. Thus, the portion of ice impacted varies from time to time, tending to provide greater shattering effect, and further the relatively wide teeth 66 tend to remove the chips from the kerf as they are produced with greater effectiveness than the relatively long teeth 66, which provide greater shattering effect. A chain driven type of ice comminuter can be employed in substantially the same arrangement that the rapidly rotating or reciprocating ice comminuters are employed.

FIG. 8 illustrates in perspective an additional embodiment of ice comminuter constructed according to principles of this invention. As illustrated in this embodiment, the comminuter is mounted on a leg 18 of a drilling platform or the like. A rack 68 is provided along at least a portion of the leg 18 so that a pinion (not shown) can be used to drive a circumscribing ring 69 along the length of the leg. During operation, the ring 69 is slowly raised and lowered along the length of the leg in the zone that may encounter ice. Mounted on the ring 69 is a surrounding ring 70 which is slowly rotated about the inner ring 69.

Mounted on the periphery of the outer movable ring 70 are a plurality of large ice comminuting teeth 71, each extending outwardly from the outer ring. In operation the teeth 71 are rapidly reciprocated in a vertical direction, that is, along the length of the leg 18 so as to rapidly strike the ice with a high rate of impact. The teeth are reciprocated by conventional pneumatic devices substantially the same as those employed in "jack hammers." The shattering effect of the teeth 71 on the ice as the ring is raised and lowered and slowly rotated maintains the area surrounding the leg 18 free from ice floe pressure.

In addition to the radially extending teeth 71 there may be provided a plurality of longitudinally extending teeth 72 at the upper and lower ends of the ring 70 so that if ice forms above or below the ring while it is inactive or withdrawn, the ice can be shattered for inserting the ring through the ice and permitting the circumferential teeth 71 to properly perform. The longitudinally extending teeth 72 are selectively reciprocated when desired in order to first cause the ring to pass through a layer of ice. In the illustrated embodiment, the longitudinally extending teeth 72 are illustrated as relatively blunt cones in order to introduce a localized impact on the ice; however, it will be apparent to one skilled in the art that sharper cones, blunt ends, or knurled ends can be provided on the longitudinally extending teeth as desired. It will be apparent also that in lieu of separately reciprocatable teeth an entire ring 70 can be longitudinally reciprocated in order to effect ice comminution. It is preferred, however, to employ a plurality of independently reciprocatable teeth since higher impact rates can be obtained and asynchronous reciprocation of the individual teeth minimizes stresses on the central ring 69.

The preferred ice comminuters have been illustrated in relation to a single leg of an oil drilling platform. It should be apparent, however, that the high impact rate comminuters can also be employed in other arrangements. Thus, for example, FIG. 9 illustrates in perspective an oil drilling platform 75 or the like on which a drilling tower 76 is mounted. The platform 75 is supported on a plurality of legs 77 extending from above the water surface through an ice floe zone to a supporting structure (not shown) in engagement with the sea floor. If desired, the legs 77 may be connected to a subfloating structure rather than to the sea floor.

Mounted on the legs 77 and extending around the entire periphery of the tower is a horizontal track 78 on which is mounted a movable carriage 79. The carriage 79 can be any of a broad variety of mechanisms for traveling around the track 78 at a controlled rate. Mounted on the carriage 79 are a plurality of ice comminuters 80 extending from the carriage down through the ice floe zone. The comminuters 80 can be any of the types illustrated in the hereinabove described embodiments of FIGS. 2 through 8.

In operation, the carriage 79 is caused to travel back and forth along the track 78 on the side or sides of the platform from which an ice floe is approaching. The comminuted ice produced passes beneath the platform and continues "downstream" with the balance of the ice floe. If desired, the carriage 79 can be traversed completely around the platform in order to assure that the ice does not freeze together again before leaving the region of the platform and for minimizing lateral pressure in directions transverse to the direction of movement of the ice floe.

FIG. 10 illustrates in perspective an arrangement for an ice comminuter particularly useful for protecting a mooring buoy either alone or when a tanker is moored thereto, at which time the comminuter also protects the stationary tanker from the ice floe. In accordance with this embodiment, there is provided a semi-submerged mooring buoy 83, such as, for example, similar to the buoy described and illustrated in U.S. Pat. No. 3,466,680. The principal portion of such a buoy 83 floats beneath the water surface with the buoyancy adjusted so that a mast 84 extends above the water surface with navigational aids 85 mounted at the top.

A peripheral track 86 around the buoy has a carriage 87 supporting a pipe 88 or similar conduit to which oil is pumped to a tanker 89. The pipe 88 connects to a flexible hose 91 so that the motion of the tanker 89 relative to the buoy can be accommodated. Preferably, a mooring hawser 92 is provided between the mooring buoy 83 and the tanker 89 for maintaining the tanker within a selected distance from the buoy. The pipe 88 connects to a fluid swivel 93 at the base of the mast 84 so that as the ship weathervanes around the buoy due to the changing influences of current and wind, the pipe can follow the ship motion without damage to the oil conducting conduit.

In the illustrated arrangement a second track 94 is provided below the track 86 and a second carriage 96 is mounted on the two tracks so that it, too, can travel around the entire periphery of the mooring buoy, as driven by a motor (not shown). Mounted on the carriage 96 is a horizontal underwater beam 97 extending to a float 98 so that as the carriage 96 traverses around the periphery of the buoy the float 98 is caused to swing in a circular arc around the center of the buoy. The float 98 is illustrated extending above water level, however, it will be apparent that it, like the buoy may be largely submerged if desired.

Mounted on the float 98 are a plurality of ice comminuters 99 providing high rate impacts on the edge of an ice floe 101. The ice comminuters 99 are preferably any of the embodiments hereinabove described and illustrated in FIGS. 2 through 8.

In operation, the tanker 89 normally floats in a position relative to the buoy 83 "downstream" from the direction of travel of the ice floe 101 since the same general influences are acting on the ice floe and on the ship. There may, of course, be situations where a temporary lateral wind may affect the ship at a different time than the ice floe, and it may be necessary to temporarily diengage the tanker from the mooring buoy under such conditions. Under normal conditions, however, the tanker is "downstream" from the buoy.

In such a situation the carriage 96 connected to the float 98 is driven back and forth along an arc 102 approximately centered on the direction of ice floe so that the ice advancing towards the buoy and ship is shattered by the comminuters 99. The shattered ice continues to move with the general movement of the ice floe and passes along a path straddling the buoy and tanker. In the illustration of FIG. 10, the ice floe 101 is illustrated as a solid sheet, as it most often is, and the region occupied by shattered ice fragments is illustrated as open water. It will be recognized, of course, that the shattered ice is substantially fluid as compared with the solid ice floe but that open reaches of water will seldom be encountered, and the open water illustrated is only for purposes of clarity in the drawings. The shattered ice remains as discrete fragments for a considerable distance "donwstream" from the comminuters and the ship is, in effect, in open water. If desired, an additional ice comminuter can be provided for travel on the carriage 96 or on the tracks 86 and 94 separate from the carriage so that during extremely adverse conditions the buoy may be maintained free of ice at all times. This is merely an added precaution for extremely adverse conditions since the buoy must remain in place at all times, whereas a tanker may leave and rely on its propulsive power and weight to counter an ice floe.

FIG. 11 illustrates in plan view an ice comminuting arrangement suitable for protecting an anchored ship or the like from the effects of an ice flow. As illustrated in this embodiment, a conventional ship 103 is anchored by one or more anchored chains 104 dropped to the sea floor. The ship 103 is provided with an ice comminuting mechanism that provides a channel of open water 105 in an otherwise solid sheet of an ice floe 106. The channel of open water 105 is like the open channel provided by the mechanism illustrated in FIG. 10, and it will be understood constitutes a region of unconsolidated ice chips in an otherwise solid ice floe rather than a stretch of open water.

The ice comminuting mechanism comprises a forwardly extending truss-like beam 107 attached to the bow of the ship 103. Connected to the forwardly extending beam 107 is a transverse beam 108, the length of which is approximately the same as the maximum width of the ship. The transverse beam 108 in the illustrated embodiment is a straight member far enough forward of the bow that it cannot in any way interfere with the anchor chains 104. The transverse beam 108 can, if desired, be provided with floating members for supporting at least a part of the weight of the beams, or if desired the beams can be connected to the ship with sufficient structural rigidity to support their own weight. It will also be apparent that if desired the transverse beam 108 can be a curved member.

Mounted on the transverse beam 108 is a carriage 109 capable of moving along the length of the beam in a controlled manner. Mounted on the carriage 109 are three ice comminuters 110, such as, for example, the type illustrated in FIGS. 2 and 3. These ice comminuters 110 rotate at high speed, thereby causing their teeth to impact on the face of the advancing ice floe 106 for shattering it and creating the open stretch of water 105 in which the ship rides. The end ice comminuters 110 are provided somewhat outwardly from the carriage 109 and the carriage is capable of travel to a position where a portion of it extends beyond the end of the beam 108 so that the width of the open stretch of water is greater than the length of the transverse beam 108.

With an ice comminuter as provided in either of FIGS. 10 or 11, the moving mechanism is mounted on a floating structure and no special mechanisms are required for raising and lowering the comminuter in response to the ebb and flow of tide. It will also be recognized that if desired the comminuter provided in the embodiment of FIG. 11 can be mounted directly on a track running around the bow of the ship so long as the track is provided at a sufficient distance from the bow that the anchor chains are not interfered with.

Although the invention has been described and illustrated in relation to structures particularly suitable for oil drilling and recovery, it will be apparent to one skilled in the art that principles of this invention are applicable to other structures subject to damage due to ice floes. Many other modifications and variations will be apparent to one skilled in the art, and it is therefore to be understood that within the scope of the appended claims the invention may be practiced otherwise than as specifically described.

What is claimed is:

1. Apparatus for preventing ice damage comprising:
- a structure fixedly positioned in water subject to moving ice floes;
- means connected to the structure adjacent the water line for comminuting ice floe in a region between the advancing ice floe and the balance of the structure, said means for comminuting comprising means for applying high velocity impacts on local areas of the ice; and
- means for traversing the means for comminuting about at least a portion of the structure adjacent the water line.

2. An apparatus as defined in claim 1 further comprising:
- means for raising and lowering the means for comminuting relative to the structure for engaging the means for comminuting with the entire vertical extent of an ice floe.

3. An apparatus as defined in claim 1 wherein the means for traversing comprises a track extending around the periphery of the structure; and
- a carriage mounted on the track for supporting the means for comminuting.

4. An apparatus as defined in claim 1 wherein the structure comprises a plurality of vertically extending legs passing through the water surface and the means for traversing comprises means mounted on each of the legs for traversing a means for comminuting about that leg.

5. An apparatus as defined in claim 1 wherein the means for comminuting comprises:
- a rotatable mandrel;
- means for rotating the mandrel at high velocity; and
- a plurality of teeth on the mandrel for impacting against an ice floe.

6. An apparatus as defined in claim 1 wherein the means for comminuting comprises:
- a vertically reciprocatable mandrel;
- means for reciprocating the mandrel at high velocity, and
- a plurality of teeth on the mandrel for impacting on ice.

7. An apparatus as defined in claim 1 wherein the means for comminuting comprises:
- a vertically movable member; and
- a plurality of reciprocatable teeth projecting from the movable member for applying high velocity impacts to ice.

8. A combination comprising:
- a mooring buoy positioned in water subject to moving ice floes;
- a track on the periphery of the mooring buoy;
- a carriage on the track;
- a substantially horizontal beam extending from the carriage;
- a buoyant member connected to the beam; and
- means mounted on the buoyant member for oscillation along an arc about the center of the buoy adjacent the water line for comminuting ice floe in a region between an advancing ice floe and the balance of the structure, said means for comminuting comprising means for applying high velocity impacts on local areas of the ice.

9. A well drilling platform comprising:
- a work platform positioned above a water surface subject to moving ice floes;
- means on the platform for drilling and completing oil wells and the like;
- a plurality of vertically extending legs from the work platform to the sea bed;
- ice comminuter means adjacent the water surface and circumscribing all of the legs for comminuting ice, said means for comminuting ice comprising means for applying high velocity impacts on the ice.

10. A platform as defined in claim 9 wherein the means for comminuting comprises:
- an ice comminuter mounted on each of the legs; and
- means for traversing the ice comminuter on each leg around the leg.

11. A platform as defined in claim 9 further comprising:
- a track extending around the platform and outside of all of the legs;
- a carriage mounted on the track for traversing around the entire platform; and wherein
- the means for comminuting is mounted on the carriage.

12. A mooring buoy for positioning in waters subject to moving ice floes comprising:
- a floating buoy;
- a track around the buoy;
- a carriage mounted on the track for motion around the buoy periphery; and
- means connected to the carriage for comminuting an advancing ice floe.

13. A mooring buoy as defined in claim 12 wherein the means for connecting the means for comminuting to the carriage comprises:
- a beam extending laterally from the carriage; and
- a buoyant structure on the beam and supporting the means for comminuting, whereby as the carriage moves about the track the means for comminuting ice oscillates along an arc about the center of the buoy for comminuting ice in a path substantially larger than the width of the buoy.

*14. A well drilling platform comprising.*

*a work platform positioned above a water surface subject to moving ice flows;*

*means on the platform for drilling and completing oil wells and the like;*

*sub-surface support means including vertically extending cylindrical leg means projecting above the surface to the work platform for holding the work platform above the surface;*

*ice comminuter means concentrically mounted on the leg means below the work platform adjacent the water surface, said comminuter means including means for applying high velocity impacts on the ice; and*

*drive means rotating the comminuter means continuously about the vertical axis of the associated cylindrical leg means for traversing the ice comminuter means around the leg means.*

*15. In a well servicing structure for supporting well servicing equipment above a water surface subject to moving ice flows, apparatus comprising.*

*sub-surface support means including vertically extending cylindrical leg means projecting above the water surface when the structure is in operative position;*

*ice comminuter means concentrically mounted on the leg means adjacent the water surface, said comminuter means including means for applying high velocity impacts on the ice; and*

*drive means rotating the comminuter means continuously about the vertical axis of the associated cylindrical leg means for traversing the ice comminuter means around the leg means.*

References Cited

The following references, cited by the Examiner, are of record in the patented file of this patent or the original patent.

UNITED STATES PATENTS

| | | | |
|---|---|---|---|
| 2,545,104 | 3/1951 | Musial | 114—42 |
| 3,521,592 | 7/1970 | Rosner et al. | 114—42 |
| 3,696,624 | 10/1972 | Bennett | 114—42 X |
| 3,759,046 | 9/1973 | Anders | 114—5 D X |
| 3,468,277 | 9/1969 | Rosner et al. | 114—42 |
| 3,318,275 | 5/1967 | Field | 114—5 D |
| 3,187,355 | 6/1965 | Wassenaar et al. | 9—8 P |

TRYGVE M. BLIX, Primary Examiner

S. M. GOLDSTEIN, Assistant Examiner

U.S. Cl. X.R.

9—8 R; 61—1, 46; 114—42; 299—24